US005149246A

United States Patent [19]

Dorn

[11] Patent Number: 5,149,246

[45] Date of Patent: Sep. 22, 1992

[54] WHEELCHAIR LIFT APPARATUS FOR COMMERCIAL VEHICLES

[75] Inventor: Russell J. Dorn, Aurora, Colo.

[73] Assignee: Stewart & Stevenson Power, Inc., Commerce City, Colo.

[21] Appl. No.: 716,860

[22] Filed: Jun. 18, 1991

Related U.S. Application Data

[62] Division of Ser. No. 524,747, May 17, 1990, Pat. No. 5,026,244.

[51] Int. Cl.[5] .................................... B60P 1/44

[52] U.S. Cl. .................................... 414/541; 414/921

[58] Field of Search ............... 414/921, 467, 522, 550, 414/553, 589, 591, 592, 630-633, 744, 785, 744.3, 539-544; 105/447

[56] References Cited

U.S. PATENT DOCUMENTS

| | | | |
|---|---|---|---|
| Re. 33,595 | 5/1991 | Sullivan et al. | 414/540 |
| 4,081,091 | 3/1978 | Thorley | 414/921 |
| 4,133,437 | 1/1979 | Gates | 414/921 |
| 4,493,602 | 6/1985 | Koerber | 414/541 |
| 4,583,466 | 4/1986 | Reddy et al. | 105/447 |
| 4,664,584 | 5/1987 | Braun et al. | 414/541 |

*Primary Examiner*—Sherman Basinger
*Attorney, Agent, or Firm*—John E. Reilly

[57] ABSTRACT

A wheelchair lift apparatus for transporting a wheelchair and its occupant into and from a commercial vehicle can be installed in the existing doorway of the vehicle on a rotation column which is capable of supporting a telescoping platform assembly for movement into and out of an operative position across the doorway, there being a retention strap to prevent accidental forward rolling movement of the wheelchair as it is lifted or lowered, and a barrier plate across the front end of the forwardmost platform section cooperates with side flanges or rails on the platform section to prevent accidental movement of the wheelchair off of the platform assembly. The platform support unit is capable of lifting and lowering substantial loads without binding, and the platform assembly is hinged to the platform support unit in such a way as to require positive manual pressure in folding and unfolding the platform assembly with respect to the support unit.

8 Claims, 4 Drawing Sheets

WHEELCHAIR LIFT APPARATUS FOR COMMERCIAL VEHICLES

This application is a divisional application of Ser. No. 524,747, filed May 17, 1990, for WHEELCHAIR LIFT APPARATUS FOR COMMERCIAL VEHICLES, invented by Russell J. Dorn, now U.S. Pat. No. 5,026,244.

This invention relates to lift apparatus; and more particularly relates to a novel and improved telescoping, collapsible wheelchair lift mechanism which is specifically adaptable for use in transporting a wheelchair and its occupant into and from commercial vehicles, such as, busses or vans.

BACKGROUND AND FIELD OF THE INVENTION

This invention is in the field of wheelchair lifts for lifting and lowering wheelchairs between the floor level of a commercial vehicle and street level. Among other problems in designing such mechanisms is to provide a compact structure which will not impede normal ingress or egress to and from the vehicle but can be easily and rapidly moved into position across a doorway and, under the complete control of the vehicle operator, move the wheelchair and its occupant onto and from the vehicle in a minimum amount of time. In this connection, it is desirable that the system be so constructed and arranged as to strap in the wheelchair on the lift when being lifted or lowered together with adequate siderails and the removal of hinges along any intermediate sections of the platform for smooth entry and exit.

Representative U.S. Patents in this field are U.S. Pat. Nos. 4,479,753 to G. R. Thorley, 4,534,450 to P. Savaria, 4,299,528 to J. E. Kazeil et al and 4,140,230 to M. R. Pearson. In addition to the foregoing, there is commercially available a wheelchair lift mechanism manufactured and sold by Gustaf Bruns Gmbh & Co. of the Federal Republic of Western Germany under the trademark "AMF HUBMATIK" BSL 350 and which is of a type designed for use in commercial vehicles having a foldable platform assembly mounted on a rotation column for swinging movement between a stored position alongside a doorway into the vehicle to an extended position across the doorway for the purpose of lifting and lowering a wheelchair and its occupant between the floor level of the vehicle and street level.

Among other problems associated with the "AMF HUBMATIK" BSL 350 design is the lack of a stable column for the platform sections, smooth and reliable operation of the platform sections and secure latching either in a raised or stored position a lowered or operative position; and further the lack of control over the platform as it is raised and lowered and the tendency of the telescoping mount to bind in lifting and lowering the platform. Another problem overcome by the present invention is a system which can be retrofit to existing buses and in such a way as to readily conform to different height requirements between the floor level and street level without sacrificing any stability or reliability in the system.

Considering other desirable features of a wheelchair lift, it is important to provide for a rotation column capable of supporting a telescoping platform assembly for movement into and out of an operative position, and an improved lock-type attachment for the platform assembly for locking in the operative and inoperative stored position. Moreover, it is desirable that the platform assembly be securely retained in the stored position and which, once released, requires that a positive pressure be applied in lowering the platform into an operative position.

SUMMARY OF THE INVENTION

Accordingly, it is an object of the present invention to provide for a novel and improved wheelchair lift mechanism for commercial vehicles and one which is specifically designed for use in the doorway of a commercial bus.

Another object of the present invention is to provide in a wheelchair lift mechanism to be mounted in the doorway of a commercial bus for a novel and improved platform assembly and its telescopic mounting with respect to a columnar support and which can be easily and simply controlled by the bus operator to assist in the entry and exit of passengers who are confined to wheelchairs.

It is a further object of the present invention to provide in a wheelchair lift mechanism for a novel and improved manner and means for retrofit mounting on existing vehicles, is conformable for use in meeting different height and size requirements of the vehicle, and further can be stored in a compact position with respect to the doorway of a vehicle without interfering with normal ingress and egress to and from the vehicle by other passengers.

It is an additional object of the present invention to provide for a novel and improved lift mechanism which can be rapidly and efficiently mounted in the doorway of a commercial bus and which occupies a minimum of space and can be folded under the control of a single operator outwardly into a platform having the necessary retention strength for secure lifting and lowering of a wheelchair and its occupant onto and from the floor level of the bus; and further wherein the lift mechanism is securely locked in the stored and operative positions and requires positive pressure or force to advance the platform assembly between the stored and operative positions.

In accordance with the present invention, a lift apparatus has been devised for lifting and lowering articles through the doorway of a vehicle between floor level and street level wherein a column is positioned in the doorway and a platform mounting unit is swiveled to the column for swinging movement between a first position inside of the vehicle and a second position extending outside of the vehicle with foldable platform sections telescopingly supported on the support unit for movement between a raised and lowered position. The improvement of this invention comprises a column in which a main support shaft is journaled at its lower end in a fixed sleeve but locked against axial movement with respect to the sleeve, and the platform sections are suspended by an index sleeve in outer surrounding relation to the main support shaft, the sleeve including index means to releasably lock the platform sections against rotation when disposed in either of the first or second positions. Preferably, the index sleeve is so mounted on the main support shaft as to rotate with the support shaft when the platform unit is swung between the first and second positions but is free to move axially with respect to the support shaft; also, the platform sections are hinged to a lower telescoping end of the platform support unit and the foldable platform sections can be extended from an overlapping position to a flat extended position when in a raised position level with the floor of the vehicle; and when the platform support unit is extended downwardly at least those platform sections outside of the vehicle will remain level in the lowered position to facilitate movement of the article, such as, a wheelchair off of the platform onto the ground.

The hinging of the platform sections is such that a smooth uninterrupted upper surface is provided, for example, to facilitate rolling of a wheelchair onto and off of the platform sections. Also, a barrier plate at the front end of the platform sections will serve as an added restraint against accidental removal of an article, such as, a wheelchar placed on the platform sections.

A spring-loaded hinge mechanism is provided between one of the platform sections and the platform support unit which will offer progressively increased resistance to lowering of the platforms away from the support unit and conversely when the platforms are raised will offer maximum resistance at the beginning of its travel but progressively reduced resistance as it approaches the upright folded position.

The above and other objects, advantages and features of the present invention will become more readily appreciated and understood from a consideration of the following detailed description of a preferred embodiment of the present invention when taken together with the accompanying drawings of a preferred embodiment of the present invention, in which:

DETAILED DESCRIPTION OF THE PREFERRED EMBODIMENT

As a setting for the present invention, the preferred form of lift mechanism 10 is shown by way of illustrative example mounted in a doorway D of a commercial bus B, there being a stairway S extending downwardly from the floor level of the bus. Nevertheless, it will be appreciated that the lift mechanism has useful application to other accessways where it is necessary to automatically raise or lower a wheelchair and occupant between different levels.

Figure 1:
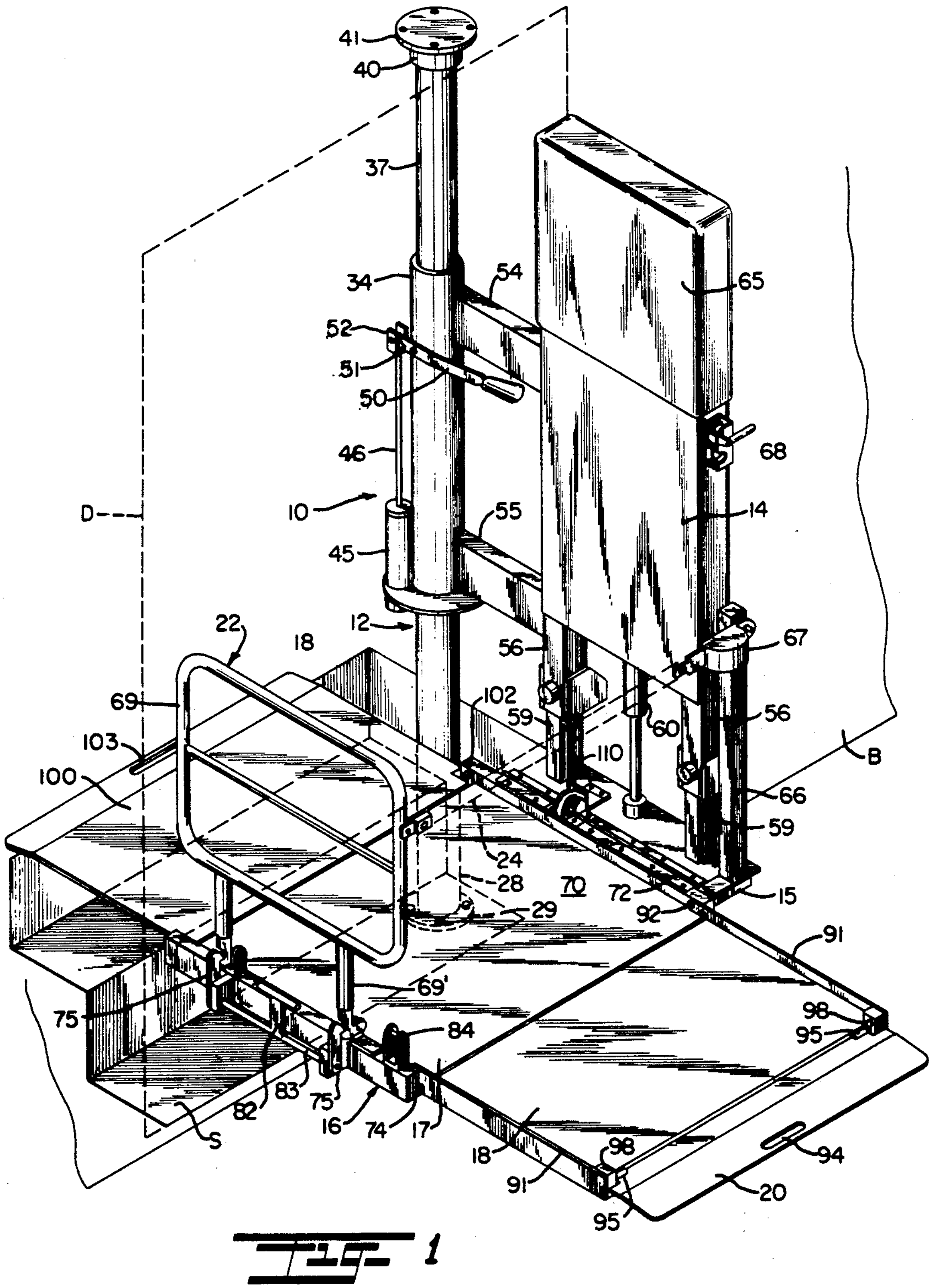
FIG. 1 is a perspective view of a preferred embodiment of the present invention shown in the extended, operative position across the doorway of a commercial bus.

As shown in FIG. 1, the preferred form of lift mechanism 10 is broadly comprised of a rotational support column 12, and a telescoping frame assembly 14 is suspended from the column 12 and has a base member 15 The support column 12 is mounted for vertical extension from the lower outside side tread portion of the stairway to the top of the door frame along one side of the doorway so that when the mechanism is in a stored position it will permit free passage into and from the bus by passengers. Further, in the relationship shown in FIG. 1, the frame support has been extended or swiveled about the support column 12 to a position extending outwardly from the side of the bus, and a platform assembly 16 is similarly shown in an extended or operative position over the stairway S and includes a central platform 17, front platform extension 18 and rear platform section 19. A barrier plate 20 is disposed at the front edge of the platform 18, and a hand rail 22 is pivotally attached at its lower end to the outer edge of the central platform section 17. In turn, the inner edge or side of the platform section 17 is hinged to the base member 15.

Figure 5:
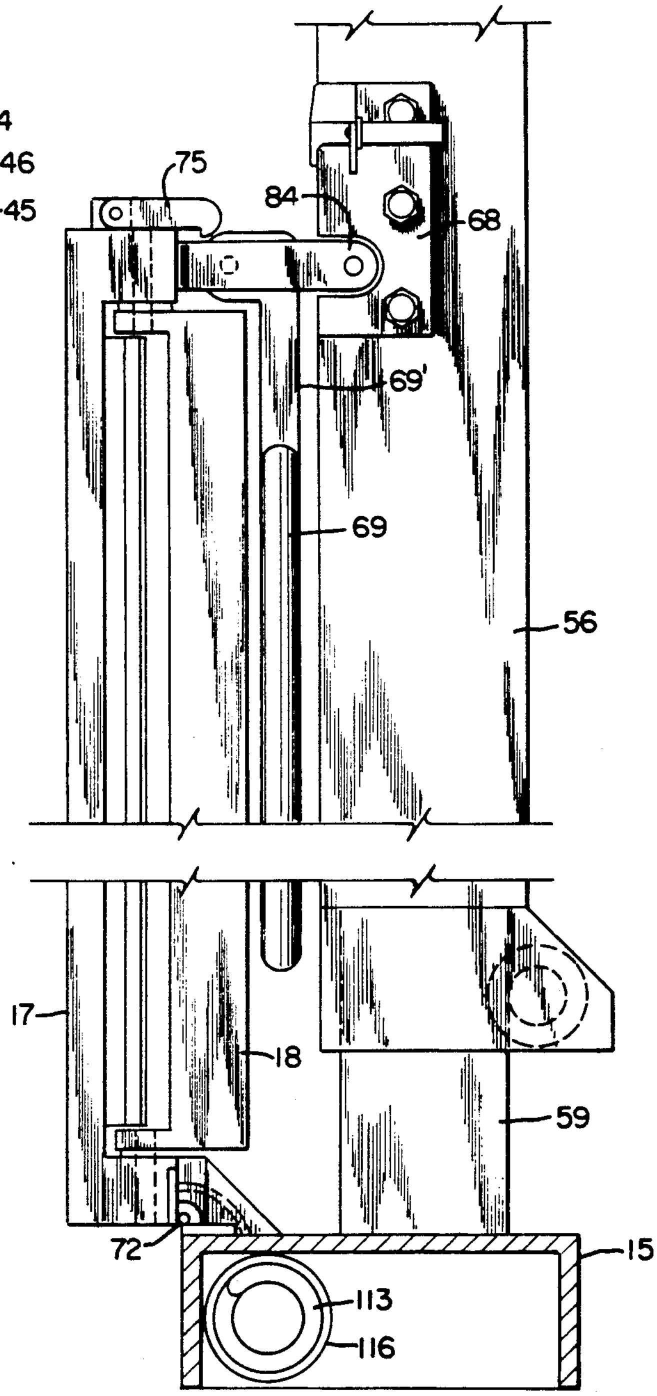
FIG. 5 is a side view illustrating the platform assembly in the raised stored position with respect to the frame support.

Briefly, the principle of operation of the lift mechanism is such that when the platform assembly is extended it will traverse the stairway area to create a level surface for advancement of a wheelchair and occupant of the chair from the floor of the bus onto the central platform 17, and a retention strap 24 is drawn across the front of the wheelchair and attached to the handrail 22 so as to prevent the wheelchair from advancing beyond the central platform section 17. Once positioned as described, the platform support unit 14 is activated to telescopingly extend the base member 1 downwardly until the front platform section 18 moves into contact with the street or curbing at which point the strap 24 is withdrawn and the wheelchair can be advanced over the front end of the platform assembly. The platform assembly 16 is then folded into a compact storage position with the handrail 22 folded downwardly against the central platform section 17 and the front and rear platform sections 18 and 19 folded over one another and over the handrail 22 following which the assembly is swung upwardly about the base member 15 into a stored position as shown in FIG. 5. The platform assembly may be folded either before or after the base member is raised, and the frame support assembly together with the platform assembly is then swiveled through the doorway into a stored position alongside and above the stairs. The sequence of operation is reversed in loading a wheelchair into the bus.

Figure 2:
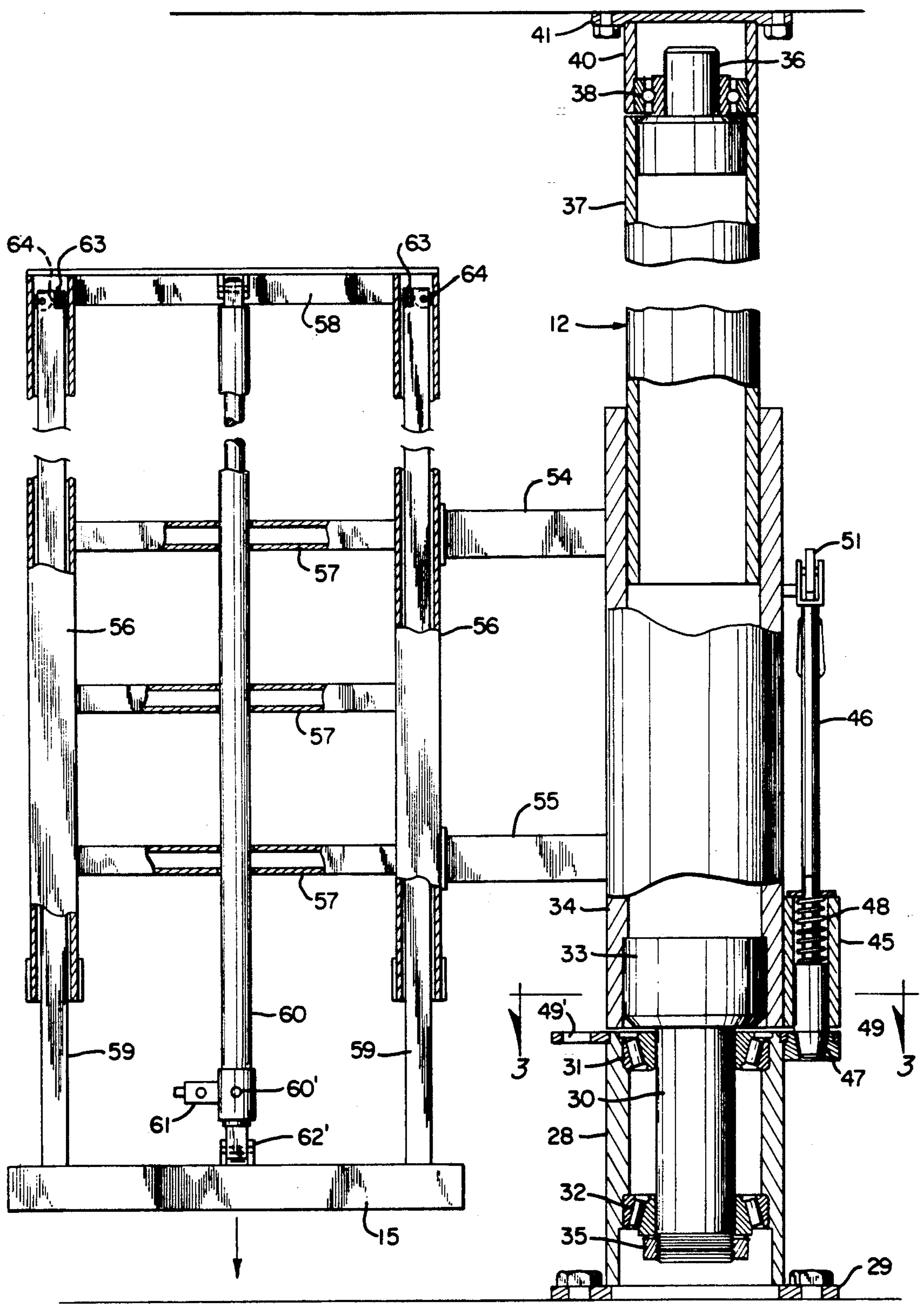
FIG. 2 is an elevational view partially in section and with parts broken away to illustrate the telescoping support frame for the platform assembly.
Figure 3:
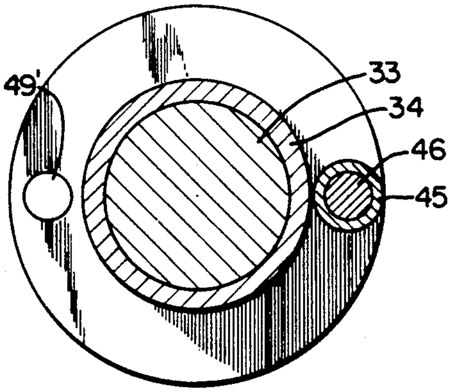
FIG. 3 is a cross-sectional view taken about lines 3—3 of FIG. 2.

Referring in more detail to the drawings, there is shown in FIG. 2 a preferred form of rotation column 12 for the telescoping frame 14 and platform assembly 16. The column 12 has a column base or sleeve 28 which is anchored as at 29 to the lowermost tread portion of the stairway, and a stub shaft 30 is captured within upper and lower bearing cones 31 and 32 within the sleeve 28, the shaft 30 defining a downward extension of reduced diameter from a larger shaft portion 33. The lower end of the shaft 30 is threaded to receive a nut 35 which bears against the underside of the bearing 32 and prevents lifting of the shaft 30 away from the column base 28. A tube 34 is welded to the shaft portion 33, and the upper end of the tube telescopingly receives an inner tube 37. The tube 37 extends downwardly from an upper stub shaft 36 which is journaled in a bearing 38 within a cap 40, the latter being anchored at 41 to a fixed portion of the vehicle, such as, a bracket mounted on the door frame, not shown.

The tube 34 acts as an index sleeve and carries an index cylinder 45 on its external wall surface, the cylinder 45 being hollow to receive an index pin 46 having a lower tapered end 47. The end 47 is biased by a coiled spring element 48 to project downwardly into a socket 49 which is fixed to the outer wall surface of the sleeve 28. As further illustrated in FIG. 1, a lever arm 50 is pivotally attached as at 51 to the index sleeve 44 and an end portion 52 on the lever arm 50 is pivotally attached to the upper end of the index pin 46. In this way, downward pressure exerted on the lever arm will cause raising of the end portion 52 and attached pin 46 against the urging of the spring 48 to release the lower tapered end 47 from the socket 49. The telescoping frame unit 14 is suspended from the sleeve 44 by upper and lower support arms 54 and 55. When the lever arm 50 releases the index pin 46 from the socket 49, the telescoping frame 14 can be swung from a position directed inwardly of the doorway 180° to the outwardly extended position as shown in FIG. 1; and upon releasing the lever arm 50 the index pin 46 will be urged downwardly to cause its tapered end 47 to enter an aperture 49' at the upper end of the sleeve 28.

Figure 4:
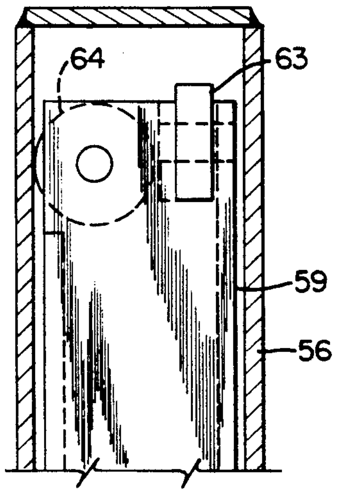
FIG. 4 is an enlarged view in section of one of the upper end of one of the telescoping rod members illustrated in FIG. 2.

The preferred form of frame support unit 14 comprises a pair of spaced parallel tubular support members 56 of rectangular cross-section interconnected by horizontally extending cross tubes 57 at vertically spaced intervals between the primary tubes 56 and an upper interconnecting crossbar 58 between upper ends of the tubes 56. The base member 15 is suspended by inner telescoping tubes 59 correspondingly of rectangular cross-section to extend upwardly through the primary or outer tubes 56, and a roller bearing 56' is mounted at the lower end of each tube 56 to bear against the inner tube 59. A hydraulic cylinder 60 extends vertically and is disposed intermediately between the upper crossbar 58 and base 15, the hydraulic drive cylinder preferably being a single-acting cylinder including a flow control valve 60 in which a selected amount of oil is admitted through an orifice 60' for downward movement under gravity to the desired position. Upward movement is caused by directing fluid under pressure from a reservoir, not shown, under the control of a motor-driven pump having a two-way valve. One suitable form of valve 61 is a Deltrol flow control valve manufactured and sold by Delta Power Hydraulics Company of Rockford, Ill.; and the pump P may be a Model 4Z186C manufactured and sold by Fenner Fluid Power of Rockford, Ill. Opposed upper and lower extreme ends of the cylinder 60 include pivotal connections 62 and 62', respectively, into the upper crossbar 58 and base 15. In addition, the upper end of each inner tube 59 is provided with a pair of upper and lower roller bearings 63 and 64 which, as shown in FIGS. 2 and 4, are disposed at right angles to one another to bear against the inner wall surfaces of the tubes 56 and, together with the bearings 56' minimize any tendency of the tubes 59 to bind as they are advanced upwardly and downwardly by the cylinders 60 through the primary tubes 56. As illustrated in FIG. 1, the primary tubes 56 are enclosed along their greater length in outside cover panels 65, and a front post 66 extends upwardly from the base member and supports a housing 67 for the strap or belt 24. A conventional form of a slam latch mechanism 68 is mounted on the front or outside of the outermost tube 56 above the belt housing 67 to retain the platform assembly 16 in an upright folded position in a manner to be described. One suitable form of slam release mechanism is the Model No. 400 unit manufactured and sold by Eberhard Manufacturing Co of Tillonsburg, Ontario, Canada.

Figure 6:
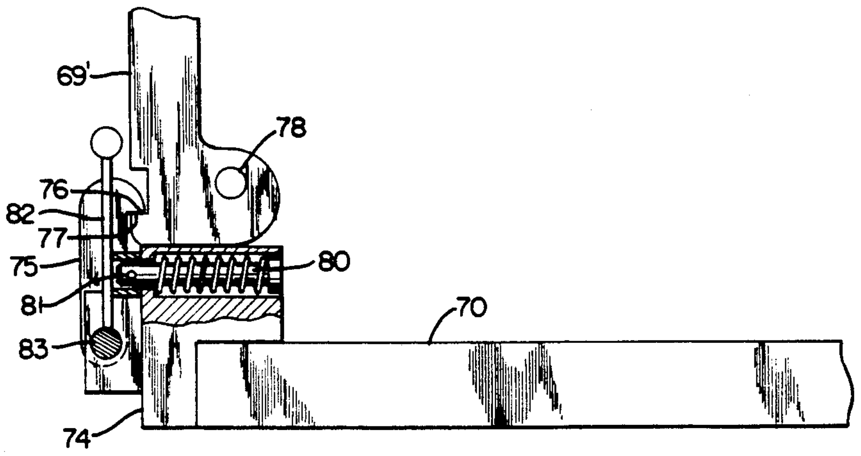
FIG. 6 is an enlarged fragmentary view partially in section of a portion of the central platform section.

As further illustrated in FIG. 1, the central platform section 17 has a flat rectangular panel 70 and a raised flange 71 along one side which is connected by a hinge 72 to the base member 15; and a second flange 74 extends along the outer or opposite edge to the hinge 72 for the purpose of supporting the siderail 22. The siderail 22 may suitably be in the form of an open rectangular frame 69 with a pair of downwardly extending legs 69'. The siderail is mounted for pivotal movement between an upright position as shown and a folded position extending horizontally across the upper surface of the platform 17 when the platform is in the extended position and as a preliminary to folding the platform assembly into the stored position. To this end, as shown in FIGS. 1 and 6, a pair of pivotal latches 75 have hook ends 76 engageable with shoulders 77 at the lower ends of the legs 69' and in horizontally spaced relation to pivotal axes 78. The latches 75 are normally urged against the flange 74 by spring-loaded rods 80, each rod 80 being attached by a pin 81 to one of the latches 75. A manual releasing arm 82 has a common connecting rod 83 into each of the latches 75 so that when the arm 82 is manually pulled in an outward and downward direction about the rod 83 will cause the latches 75 to be swung outwardly away from engagement with the shoulders 77 so that the siderail 22 is free to fold downwardly against the platform panel 70. A latch 84 is positioned at one end of the flange 74 for movement into engagement with the slam latch mechanism 68 when the platform assembly is returned to the upward stored position. In addition, a catch 86 is attached to the front edge of the siderail 22 for receiving the free end of the belt 24 when the siderail 22 is in the upright locked position as shown.

The front and rear platform sections 18 and 19 are so constructed and arranged as to form smooth uninterrupted extensions of the central platform section 17 when in the extended position; yet are capable of being folded into overlapping relation with respect to one another and to the central platform 17 as a preliminary to raising the entire platform assembly into a storage position. For this purpose, the front platform section 18 has a flat panel 90 with upwardly extending side flanges 91 forming ledges along opposite sides of the panel 90 and which are pivotally attached as at 92 to the respective flanges 71 and 74 on the central platform section 17. In connected relation, the platform panel 90 forms a smooth uninterrupted and flush extension of the panel 70 of the central platform by placing the hinge points or pivotal connections 92 at outsides of the panel portions 90 and 70. The barrier plate 20 includes a hand grip 94 and defines a forward extension of the front panel 90 with pins 95 formed with flattened end surfaces at opposite ends of the plate. The pins 95 are inserted in generally key-hole shaped sockets 98 at the front edges of the flanges 91, and when the barrier plate 94 is raised or swung into a vertical position with respect to the panel 90 will slide downwardly into the lower ends of the sockets 98 to retain the plate in a raised position. In order to release the barrier plate 20 and return it to the horizontal position, as shown in full in FIG. 1, the plate is lifted to raise the pins 95 into alignment with the upper circular ends of the keyhole sockets 98 whereupon the plate can be returned to a horizontal position forming a flush continuation of the panel 90. Most desirably, when the platform assembly 16 is unfolded and the wheelchair or other article is loaded onto the platform the barrier plate 20 is raised into the vertical position to avoid accidental rolling of the wheelchair off of the platform assembly.

As further shown in FIG. 1, the rear platform section 19 has a flat panel 100 which is pivoted by suitable pivot pins 102 in apertures provided in rearward ends of the flanges 71 and 74 on the central platform section 17. Again by pivoting the rear platform section at opposite corners as shown permits the panel 100 to form an uninterrupted continuation of the central panel 70. A hand grip 103 is formed in the rearward end of the panel 100 to facilitate pivoting of the rear panel section 19 between the folded and extended positions as described.

Figure 7:
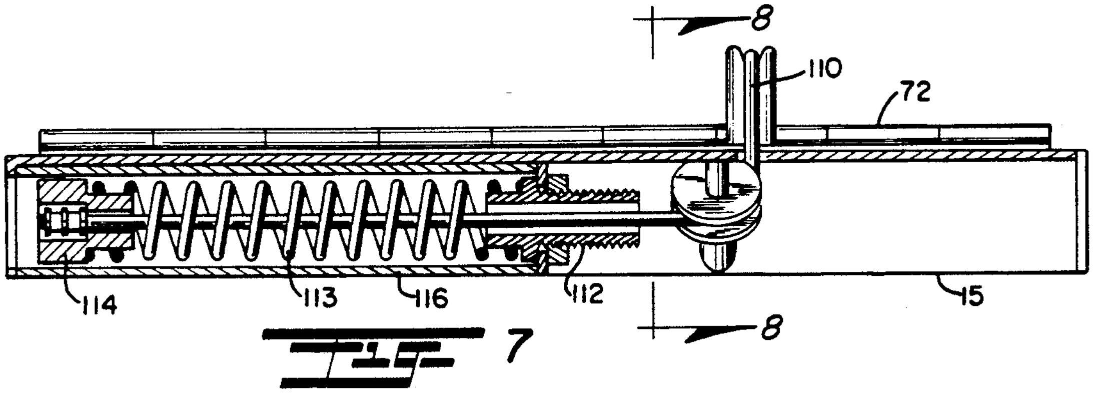
FIG. 7 is an enlarged sectional view of a spring control mechanism for the platform assembly and illustrating the mechanism when the platform is in a raised position.
Figure 8:
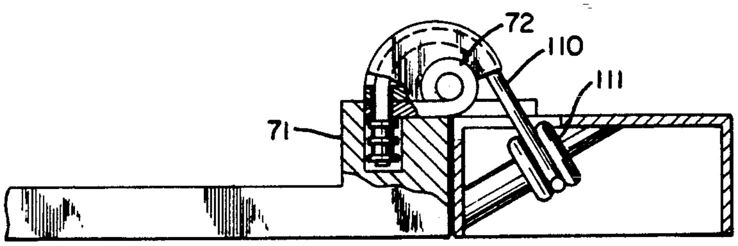
FIG. 8 is a cross-sectional view taken about lines 8—8 of FIG. 7 but with the platform assembly in the extended operative position.

In order to fold the platform assembly for storage, after the siderail 22 is released and folded over the center platform 17, and thereafter the siderail 22 is released and folded over the panel sections 18 and 19, the front and rear panel sections 18 and 19 are pivoted into overlapping relation to one another and to the center platform 17. The panel assembly is then swung upwardly about the hinge 72 into the raised or upright storage position as shown in FIG. 5. As the platform assembly approaches the support unit 14, the latch 84 will move into engagement with the latch mechanism 68 thereby securely retaining the platform assembly in closely spaced parallel relation to the support unit 14. Referring to FIGS. 7 and 8, movement of the platform assembly 16 between the extended operative position and folded position is preferably controlled by a cable 110 which passes over the hinge 72 from attached relation to the flange 71 on the platform section 17. The cable enters a slot in the channel-shaped base member 15 and passes over a guide roller 111 through a hollow adjustment bolt 112 and a coiled spring 113 and is attached to an end stop 114. The coiled spring 113 is mounted under compression between the end stop 114 and the adjustment bolt 112 as shown, and the bolt 112 is threadedly connected to the end of a tube 116 which is mounted within the base member 15. The tension of the coiled spring 113 is preset by means of the adjustment bolt 112 so that when the platform is released from the slam latch mechanism 68 and lowered toward the extended position the cable 110 will cause the spring 113 to be compressed and offer progressively increased resistance to lowering of the platform; and conversely when the platform is raised the spring-loaded cable 110 will offer maximum resistance in the beginning but progressively lessened resistance as the platform approaches the upright stored position. This will assist the operator in the raising and lowering process as well as to discourage any sudden movements in raising or lowering the platform assembly.

Figure 9:
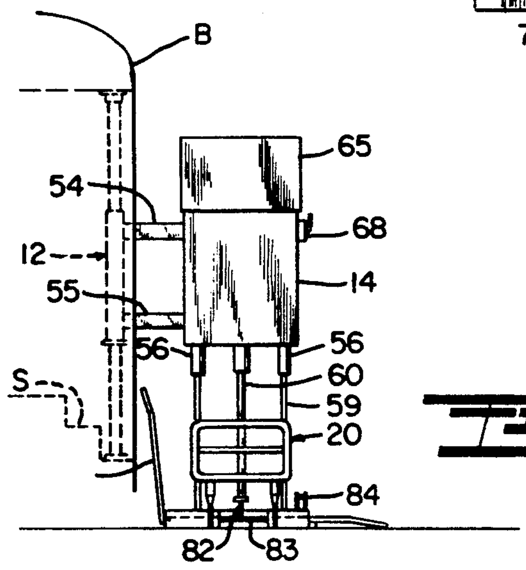
FIG. 9 is a side view of the platform assembly in the extended and lower position.

In practice, the hydraulic cylinder 60 can be remotely controlled by the driver through the pump P to regulate the telescoping movement of the support unit 14. As a preliminary to actuation of the pump P and assuming that the lift mechanism is to be used in transporting a wheelchair from the bus to street level, the lever arm 50 is used to release the index pin 46 and swing the support unit 14 outwardly through the doorway and into a position extending outside of the bus and the index pin 46 engaging the socket 49, as shown in FIG. 1. The platform assembly is unfolded so that the rear platform section 19 is flush with the floor of the bus and extends over the stairway with the center section 17 and front section 18 extending outwardly beyond the stairway. The wheelchair is advanced over the rear section 19 and onto the central section with the retention strap 24 extended across the front edge of the center section and fastened to the clasp or latch 86. The barrier plate 20 is swung into a vertical position across the front edge of the front section 18 as an additional restraint against accidental movement of the wheelchair off of the platform. The valve on the pump is then shifted to permit oil to flow through the valve 61 to permit the base member 15 to move downwardly until the central and front platform sections 17 and 18 reach the street or curbing level as shown in FIG. 9. The strap is released and the barrier plate 20 is shifted from a vertical position to horizontal extended position, as shown in FIG. 1, following which the wheelchair is advanced forwardly across the front section 18. Once the wheelchair is clear of the platform assembly, the siderail 22 is folded along with the front and rear sections 18 and 19 as earlier described, and the folded assembly is then swung into an upright position, as shown in FIG. 5, with the catch 84 engaging the latch 68. The cylinder 60 is activated to raise the base member 15 and platform assembly to the floor level of the bus. The index pin 46 is released from engagement by pivoting the lever 50 downwardly and the support unit 14 and platform assembly 16 swung inwardly into a position within the bus and alongside the stairway. The assembly is retained in the inward position by aligning the index pin with one of the sockets 49 and releasing the lever 50.

It will be appreciated from the foregoing that a highly reliable form of lift mechanism has been devised and which is specifically adaptable for use in lifting and lowering wheelchair patients onto and from the floor level of a commercial vehicle, such as, a bus. The rotation column 12 is telescopingly adjustable so as to adapt to different height doorways, and the platform mounting unit is capable of swiveling through the range necessary for movement between an inward position alongside the doorway and an outward position. An indexing pin on the rotation column operates to securely lock the platform mounting unit in either position by extension into sockets 49 positioned at the desired locations. The hinging of the platform sections on either side of the adjoining sections assures a smooth uninterrupted surface for advancement of the wheelchair across the sections. Moreover, the side flanges along the platform sections together with the barrier plate 20 at the front end prevent accidental rolling of the wheelchair over the side or front end of the platforms. The platform mounting unit includes the single-acting hydraulic cylinder 60 which will permit gravity movement of the platform sections downwardly from the floor level to street level and return movement to the raised position all under the control of the operator. Nevertheless, it will be apparent that other forms of control may be used in advancing the platform sections between their upper and lower levels of movement.

It is therefore to be understood that while a preferred embodiment of the present invention has been set forth and disclosed herein, various modifications and changes may be made in the specific construction and arrangement of parts comprising the present invention without departing from the spirit and scope thereof as defined by the appended claims and reasonable equivalents.

I claim:

1. In lift apparatus for a vehicle having a doorway, a raised floor level above the doorway and stairs between the doorway and the floor level, the improvement comprising:

a vertical support at one side of the entrance to the doorway;

platform support means connected in swiveled relation to said vertical support, said support means including drive means, telescoping guide members and a base member movable between said floor level and street level in response to actuation of said drive means;

a foldable platform assembly including hinge means connecting said assembly in hinged relation to said base member, said platform assembly including a center platform section, and front and rear platform sections hinged in relation to said center platform section, and adjustable control means associated with said hinge means to selectively resist movement of said platform assembly from an upward position to a downward position;

each of said platform sections being of flat, generally rectangular configuration, and means pivotally interconnecting adjacent of said sections whereby said sections are disposed in flush relation to one another in an extended position and are foldable upon one another in an stored position by pivoting said front and rear platform sections over said central platform section; and a barrier plate at one end of said front platform section, said barrier plate including pivot means pivotally interconnecting said plate to said front platform section for movement between a vertical position and a horizontal position.

2. In lift apparatus according to claim 1, said pivot means including pivot pins insertable in oversized openings on said front platform, and a flattened portion engageable with said front platform to retain said barrier plate in the vertical position.

3. In lift apparatus according to claim 1, said hinge means including a raised flange connecting said assembly in hinged relation to said base member.

4. In lift apparatus according to claim 1, said front platform section having raised side flanges along opposite sides thereof, and said pivotal interconnecting means disposed at opposite sides of adjacent of said platform sections whereby said sections form smooth uninterrupted continuations of one another within the extended position.

5. In lift apparatus according to claim 1, there being a pair of telescoping guide members disposed in spaced parallel relation to one another, each of said guide members defined by inner and outer concentric tubular members extending upwardly from said base member, and said rive means including a fluid-actuated cylinder extending in spaced parallel relation to said guide members.

6. In lift apparatus according to claim 5, including means rigidly interconnecting said guide members, each of said inner tube members having roller bearings disposed at right angles to one another for engagement with circumferentially spaced surface portions on inner walls of said outer tube members.

7. In lift apparatus according to claim 1, said adjustable control means including a spring-loaded cable between said center platform section and said base member to impart progressively increased resistance to lowering of said platform assembly away from said support means and progressively reduced resistance to raising of said platform assembly.

8. In lift apparatus according to claim 1, said platform assembly including a side rail on one side of said center platform opposite to said platform support means, and a retractable extension belt extending between said platform support means and said side rail.

* * * * *